Feb. 22, 1938.　　　　R. D. CARLETON　　　2,109,329
ENGINE MOUNT
Original Filed April 12, 1934　　2 Sheets-Sheet 1

INVENTOR.
RALPH D. CARLETON.
BY
ATTORNEYS.

Feb. 22, 1938.  R. D. CARLETON  2,109,329
ENGINE MOUNT
Original Filed April 12, 1934  2 Sheets-Sheet 2
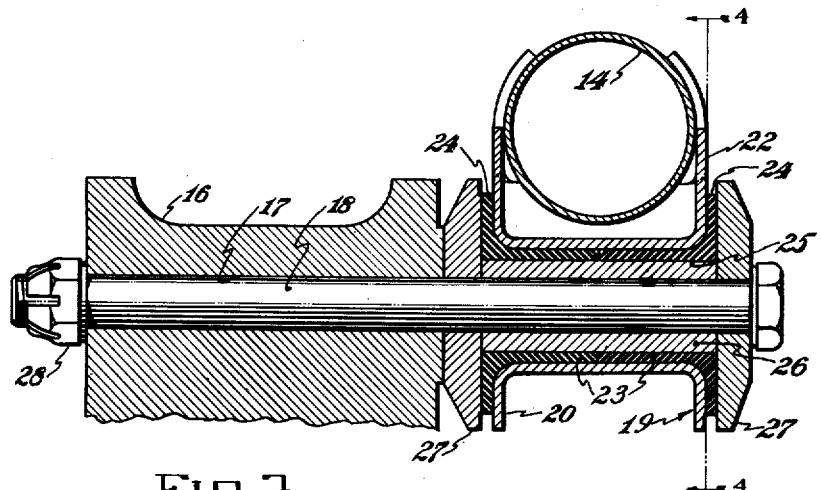
Fig.3.
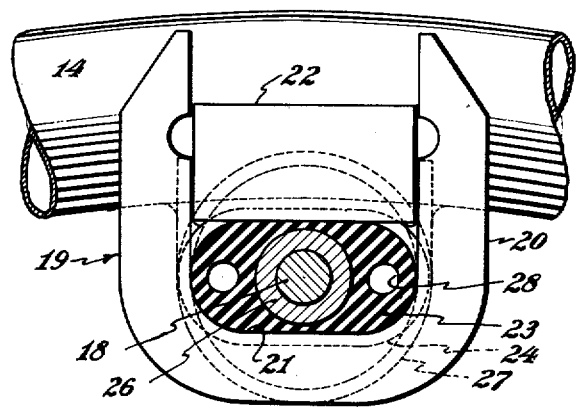
Fig.4.
Fig.5.
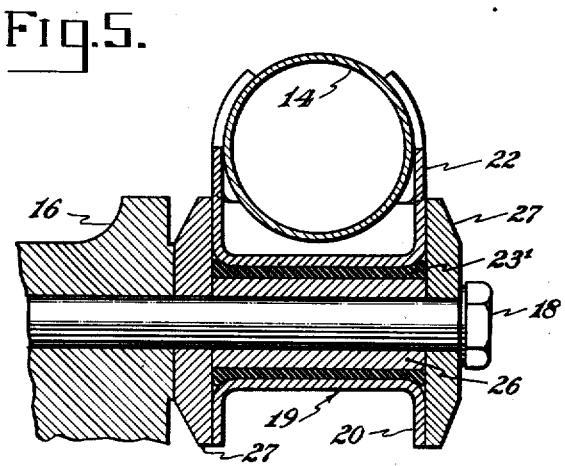
INVENTOR.
RALPH D. CARLETON.
BY
ATTORNEYS.

Patented Feb. 22, 1938

2,109,329

UNITED STATES PATENT OFFICE 2,109,329

ENGINE MOUNT

Ralph D. Carleton, Snyder, N. Y., assignor, by mesne assignments, to Curtiss-Wright Corporation, a corporation of New York Application April 12, 1934, Serial No. 720,192
Renewed November 20, 1937

11 Claims. (Cl. 248—5)

This invention relates to improved means for mounting engines on aircraft.

The usual mounting for engines of the radial air-cooled type, to the aircraft structure, include a mounting ring at the forward end of the aircraft, the ring carrying lugs with which the mounting bosses on the engine crankcase register. Suitable bolts passing through the lugs and bosses anchor the engine rigidly to the mount. With engines of large horse power mounted as above, tendencies toward torsional vibration when operating at high power, cause a considerable vibration in the aircraft structure. The construction afforded by my invention allows a resilient cushioning of the torsional vibration induced by the engine, while rigidly mounting the engine to the aircraft fuselage in other planes.

An object of the invention is to provide a simple mounting means for an engine to an aircraft, whereby cushions against torsional vibration are provided.

A further object is to provide means for holding the engine rigidly in planes other than planes parallel to that of crankshaft rotation.

A further object is to provide means for compensating slight inaccuracies in the alignment of the engine bosses and the mounting lugs, so that undue assembly strains will not occur upon assembly.

Still another object is to provide lugs on an aircraft mounting ring, with associated structure, which may be readily incorporated in existing types of aircraft, without major changes therein.

For further objects and a fuller explanation of the invention, reference may be made to the attached specification in conjunction with the drawings, wherein similar numbers indicate similar parts, and wherein:

Fig. 3 is a section on the line 3—3 of Fig. 1;

Fig. 4 is a section on the line 4—4 of Fig. 3; and

Fig. 5 is a view similar to Fig. 3, showing an alternative organization of the engine mounting parts.

Figure 1:
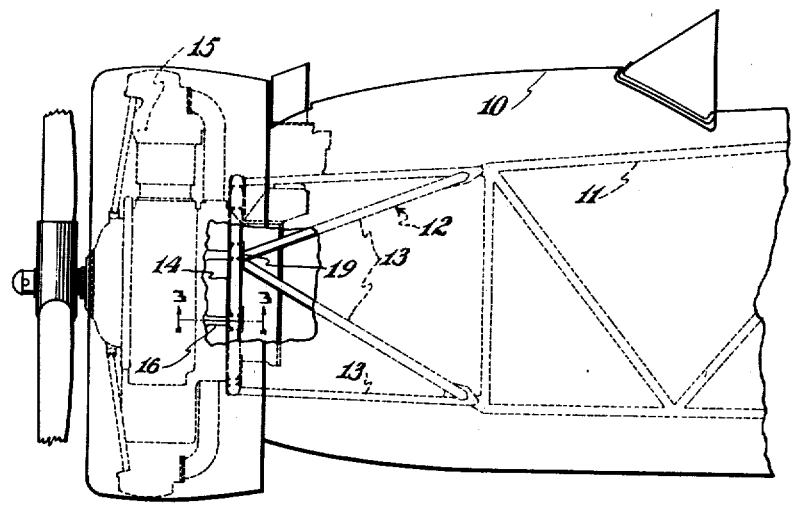
Fig. 1 is a side elevation of the forward portion of an aircraft fuselage, partly broken away to show the engine mount.
Figure 2:
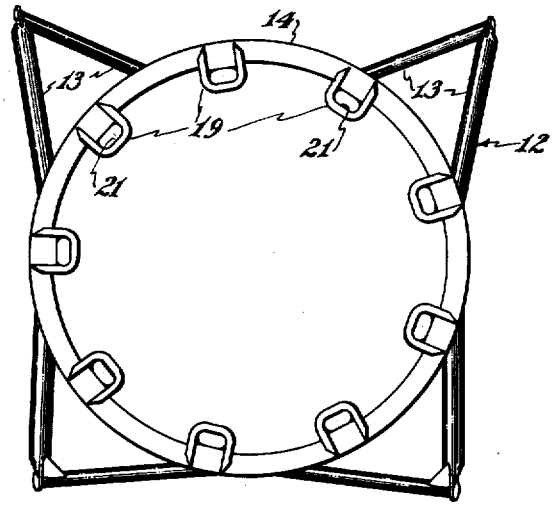
Fig. 2 is a front elevation of the engine mounting structure.

In Fig. 1, an aircraft fuselage 10 includes a fuselage skeleton 11, to the forward end of which a detachable engine mount structure 12 is bolted. This structure 12 includes diagonal braces 13 at the forward ends of which a mounting ring 14 is welded. Said ring is of slightly larger diameter than the bolt circle at the rearward end of the case of the engine 15, said bolt circle, as is the usual practice, being organized on a plurality of mounting bosses 16, there commonly being a number of mounting bosses 16 corresponding to the number of engine cylinders. The bosses 16 are provided with fore and aft bores 17 in which mounting bolts 18 engage.

The ring 14 carries a plurality of circumferentially spaced lugs 19, each lug consisting of a channel section 20 bent in U-shape. The ends of the U are attached as by welding to the ring 14, whereby, an elongated opening 21 is formed between the bottom of the U and the ring. A filler piece 22 may be set between the ring and the lug, whereby a substantially flat fore and aft surface for the opening 21 is provided.

Referring to Figs. 3 and 4, a pair of similar blocks 23 of rubber or other resilient composition are inserted within each elongated opening 21, these blocks being molded to conform exteriorly with the conformation of the opening 21. The blocks may be provided with end flanges 24 which bear upon the forward and rearward surfaces of each lug 19, and are also provided with a circular central bore 25 within which a bushing 26 is inserted. A flat washer 27 overlies each flange 24 of each block 23, and likewise abuts against one end of the bushing 26. The mounting bolt 18 is then passed through one washer 27, the bushing 26, the other washer 21, and the engine boss 16, whereupon the whole assembly may be tightened by means of a nut 28. Due to the elongated shape of the opening 21 and the blocks 23, there is a considerable amount of block, circumferentially, between the bushing 26 and the ends of the opening 21, whereby resilient movement of the bushings, mounting bolts and engine may take place with respect to the mounting ring. Due to the small distance between the surface of the bushing 26 and the upper and lower portions of the block 23, practically no movement takes place in this direction. Likewise, fore and aft movement of the engine boss 16 with respect to the mounting 14 is greatly limited, due to the relatively thin flanges 24 of the rubber blocks. The thin flanges, and the top and bottom thin walls of the rubber blocks are provided to permit of ready assembly of the engine on the mount, as a slight lack of alignment is apt to occur due to differences in the relative positions of the blocks and engine bosses. Such thin resilient sections, however, permit practically no relative movement between the engine and the ring, where those thin sections take any stress. Thereby, the engine is virtually rigidly held to the ring in a fore and aft direction and in planes of movement other than rotative.

Since materials such as rubber are incompressible, but depend upon their resilience for tensile deformation, the elongated blocks 23 are provided with bores 28. These provide relief for the rubber when compressive stresses are imposed thereon, the rubber deforming to fill the bores 28. Preferably, the blocks 23 should be assembled with some initial stress which may be accomplished by fabricating the blocks with slightly larger dimensions than the opening 21. The rubber may be squeezed into the opening, then, to produce said initial stress.

Fig. 5 shows an alternative embodiment of the invention, wherein the block 23' is not provided with flanges. In this case, the washers 27 abut directly against the forward and rearward faces of the lug 19, as well as against the forward and rearward faces of the bushing 26. Since the block 23' is not provided with flanges, it may be in one piece, extending clear from the forward to the rearward faces of the lug. In other respects, the construction of Fig. 5 is substantially identical with the previous embodiment. It may be here mentioned that the subject construction has been used in conjunction with a number of aircraft, and has been found eminently satisfactory, being simple in maintenance and effective in operation.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In a torsionally resilient mount for an aircraft engine including a mounting ring, a plurality of circumferentially spaced lugs thereon, each said lug comprising a U-shaped member having parallel elements thereof parallel to the ring axis, the legs of the U being attached to the ring to define an elongated opening bounded by the interior surface of the U member and by a portion of the ring, a resilient block closely fitting in said elongated opening, and means parallel with said ring axis passing through said block and bearing on both sides of said lug for holding the engine against movement in any direction except circumferential movement on said ring, said circumferential movement being limited by the bearing of said means against said resilient block.

2. Means for mounting an aircraft engine on a mounting ring including a ring lug having an opening shaped as an oval cylinder, the axis of which is parallel to the ring axis with the major dimension of said oval being disposed substantially tangentially to said ring, a resilient block filling said opening, said block having a central bore, a metallic bushing engaging within said bore, said bushing being movable circumferentially of said ring by virtue of the oval shape of said resilient block, a mounting bolt passing through said bushing, and a washer at each end of said bushing bridging said resilient means to engage the forward and rearward faces of said lug, said bolt being organized to firmly clamp said washers against the ends of said bushing and said lug faces to prevent axial play.

3. An assembly for mounting an engine on a mounting ring for permitting torsional movement of the engine with respect to the ring, and for preventing other movement, comprising a lug carried by the ring and having an elongated opening extending through the lug, the long dimension of said opening being concentric with the ring, a block of rubber or the like filling said opening, said block having a central bore through which a mounting bolt may pass, the block opening being of a diameter nearly as great as the shorter dimension of said block, whereby the mounting bolt is capable of being moved to deform said block along its longer dimension, but is capable of substantially no movement in a direction parallel to the shorter dimension of said block.

4. In an engine mount including a ring to which circular engine mounting bosses are adapted to be attached, a plurality of lugs spaced around said ring each having an opening the axis of which is substantially parallel to the engine axis, and each said opening being elongated on a line substantially tangent to said ring, a resilient cushion shaped to fill each said lug opening having a circular bore parallel to said engine axis, a washer at each end of each said lug, covering said cushion, and a bolt passing through each said cushion and said washers anchored to one said mounting boss.

5. In an engine mount including a ring having a plurality of circular mounting devices spaced therearound for attachment of said engine thereto, each said device comprising a lug having a through opening, said opening being relatively narrow on a radius of said ring and relatively wide along a line substantially tangential to said ring, a resilient block conforming to the shape of said opening and lying therewithin, said block having an axial bore substantially parallel to the ring axis, and a bolt for attachment to said engine engaging within said block bore, said bore having a diameter, upon assembly of said bolt therein, which is only slightly less than the radial width of said lug opening, and substantially one-third as great as the wide tangential dimension of said opening.

6. In an engine including a mounting ring, a cylindrical resilient block having its axis parallel with the ring axis, having a central coaxial bore and an elongated cross section wherein the longer cross-sectional dimension is at least twice the shorter cross-sectional dimension, a lug fixed to said ring and having an opening complementary in shape to said block, within which opening said block is engaged, washers abutting the ends of said block, and a bolt passing through said block bore and attached to said engine, said bolt being capable of limited movement against said resilient block in a direction parallel to the longer block dimension.

7. In an engine mount having a ring element and an engine boss element, a bolt parallel to the engine axis fixed to one said element, a lug fixed to the other said element having an opening axially parallel to the engine axis through which said bolt freely passes, said opening being oblong in section and having its longer dimension on a line substantially parallel to a tangent to said ring, whereby spaces are provided on each side of said bolt, and rubber masses within each such spaces to resiliently resist movement of the bolt relative to the lug.

8. In a torsionally resilient mount for an aircraft engine including a mounting ring and a plurality of attachment lugs spaced circumferentially thereon, said lugs being adapted to receive the engine mounting bolts, resilient cylinders of elongated cross-section having their elements parallel to the ring axis and having the major cross-sectional dimension substantially tangent to the ring periphery, one said cylinder being encased within each said lug, and bushings axially located within each said cylinder adapted to receive the engine mounting bolts, said bushings, with said bolts, being capable of slight movement circumferentially of said ring by virtue of the greater mass of resilient cylinder material circumferentially located with respect to each said bushing.

9. In a torsionally resilient mount for an aircraft engine wherein there is substantially no axial resilience and substantially no resilience along lines normal to and intersecting the engine axis, a mounting ring lying in a plane normal to the engine axis, lugs circumferentially spaced on said ring having oblong cylindrical bores, the axis of each said bore lying parallel to the engine axis, the major cross-sectional dimension of each said bore lying substantially parallel to a ring tangent and the minor cross-sectional dimension lying substantially in a radius of said ring, rubber blocks complementary in shape to, and lying within, each said lug bore, and mounting means passing through said blocks parallel to the engine axis, said means being circular in section and having a diameter nearly as great as the minor cross-sectional dimension of said bore, and means for constraining said mounting means from axial movement relative to said lugs.

10. In a mount for an engine having a shaft, mounting elements circumferentially arranged about said shaft, engine boss elements each organized for engagement with one said mounting element, a bolt fixed to each of one set of elements and lying parallel to the engine axis, a lug fixed to each of the other set of elements, each lug having an opening axially parallel to the engine axis through which one said bolt freely passes, said openings being oblong in section and having their longer dimension on a line tangent to a circle concentric with the engine shaft axis, whereby spaces are provided at each side of each said space defined by the bolt and the walls of the opening, and resilient masses within each such space to resiliently resist movement of the bolt relative to the lug.

11. In a mount for an engine having a shaft, a mounting element radially spaced from the shaft axis, an element on said engine engaging said mounting element, one said element having an opening axially parallel to the shaft axis elongated in section on an arc substantially concentric with the shaft axis, the other said element engaging with said opening so as to provide spaces on either side of said last element defined by the surfaces of said element and the walls of said elongated opening, and resilient means within said spaces to resist rotative movement of said engine about the shaft axis, with respect to said mounting element.

RALPH D. CARLETON.